(12) United States Patent
Chen et al.

(10) Patent No.: US 7,818,775 B2
(45) Date of Patent: Oct. 19, 2010

(54) SYSTEM AND METHOD FOR RECORDING AND TIME-SHIFTING PROGRAMMING IN A TELEVISION DISTRIBUTION SYSTEM WITH LIMITED CONTENT RETENTION

(75) Inventors: Zesen Chen, Pleasanton, CA (US); Peter Chou, San Ramon, CA (US); Sean Chen, Sunnyvale, CA (US); Brian Gonsalves, Antioch, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 713 days.

(21) Appl. No.: 11/316,537

(22) Filed: Dec. 21, 2005

(65) Prior Publication Data

US 2007/0143809 A1    Jun. 21, 2007

(51) Int. Cl.
H04N 7/173 (2006.01)

(52) U.S. Cl. .................... 725/134; 725/119; 725/120; 725/115

(58) Field of Classification Search ............... 725/119, 725/118, 115, 120, 134
See application file for complete search history.

(56) References Cited

U.S. PATENT DOCUMENTS

| | | | |
|---|---|---|---|
| 5,351,075 A * | 9/1994 | Herz et al. ............. | 725/13 |
| 5,930,473 A | 7/1999 | Teng et al. | |
| 6,502,139 B1 | 12/2002 | Birk et al. | |
| 6,850,252 B1 | 2/2005 | Hoffberg | |
| 6,862,624 B2 | 3/2005 | Colby et al. | |
| 6,915,528 B1 | 7/2005 | McKenna, Jr. | |
| 6,941,508 B2 | 9/2005 | Abbott et al. | |
| 7,574,442 B2 * | 8/2009 | Takeda et al. ............. | 707/10 |

(Continued)

FOREIGN PATENT DOCUMENTS

CA    2321462    3/2002

(Continued)

OTHER PUBLICATIONS

Acharya, Swarup , et al., "Scheduling On-demand Broadcasts: New Metrics and Algorithms", *Proc. of Fourth Annual ACM/IEEE International Conference on Mobile Computing and Networking*, (1998),1-12.

(Continued)

*Primary Examiner*—Lester Kincaid
*Assistant Examiner*—Yu (Andy) Gu
(74) *Attorney, Agent, or Firm*—Andrew Gust; Guntin Meles & Gust, PLC

(57) ABSTRACT

Various embodiments of the disclosed subject matter provide methods and systems to record broadcast programming for at least one television channel for a period of time, wherein the recording is performed upstream from subscribers in a television distribution system, and further including after the period of time, keeping recorded programming by request from at least one subscriber. And further wherein the request is for at least one television program contained in the recorded programming or for a time window for a particular channel. According to another embodiment a subscriber requests that broadcast programming be saved for the subscriber upstream from the subscriber in a television distribution system, and wherein the subscriber may request the programming be saved for later viewing by the subscriber between the time the programming was broadcast and a later point in time.

16 Claims, 6 Drawing Sheets

U.S. PATENT DOCUMENTS

| | | |
|---|---|---|
| 2001/0046372 A1 | 11/2001 | Astle et al. |
| 2002/0124099 A1* | 9/2002 | Srinivasan et al. .......... 709/231 |
| 2003/0009718 A1 | 1/2003 | Wolfgang et al. |
| 2003/0051172 A1 | 3/2003 | Lordemann et al. |
| 2003/0061280 A1 | 3/2003 | Bulson et al. |
| 2003/0061362 A1 | 3/2003 | Qiu |
| 2003/0069964 A1 | 4/2003 | Shteyn et al. |
| 2003/0101451 A1 | 5/2003 | Bentolila et al. |
| 2003/0177503 A1 | 9/2003 | Sull et al. |
| 2003/0200548 A1* | 10/2003 | Baran et al. ................... 725/90 |
| 2003/0208767 A1* | 11/2003 | Williamson et al. ........... 725/93 |
| 2004/0128317 A1 | 7/2004 | Sull et al. |
| 2004/0154040 A1* | 8/2004 | Ellis ............................. 725/58 |
| 2004/0226051 A1 | 11/2004 | Carney et al. |
| 2005/0022242 A1 | 1/2005 | Rosetti et al. |
| 2005/0028206 A1 | 2/2005 | Cameron et al. |
| 2005/0155079 A1* | 7/2005 | Chen et al. ................... 725/115 |
| 2005/0163476 A1 | 7/2005 | Kosugi et al. |
| 2005/0165849 A1 | 7/2005 | Moradi et al. |
| 2005/0177853 A1 | 8/2005 | Williams et al. |
| 2005/0193010 A1 | 9/2005 | DeShan et al. |
| 2005/0195901 A1 | 9/2005 | Pohjola et al. |
| 2006/0029093 A1 | 2/2006 | Van |
| 2006/0262220 A1 | 11/2006 | Nakamura et al. |
| 2007/0143813 A1 | 6/2007 | Chen et al. |
| 2007/0180465 A1 | 8/2007 | Ou et al. |

FOREIGN PATENT DOCUMENTS

| | | |
|---|---|---|
| CN | 1494264 | 5/2004 |
| JP | 2002342197 | 11/2002 |
| JP | 2003224801 | 8/2003 |
| JP | 2004312413 | 11/2004 |
| WO | WO-0184336 | 11/2001 |
| WO | WO-2005074245 | 8/2005 |
| WO | WO-2007076041 A2 | 7/2007 |
| WO | WO-2007076041 A3 | 7/2007 |
| WO | WO-2007076042 A2 | 7/2007 |
| WO | WO-2007076042 A3 | 7/2007 |
| WO | WO-03067594 A1 | 8/2007 |

OTHER PUBLICATIONS

Chang, Ray-I, et al., "An Effective and Efficient Traffic Smoothing Scheme for Delivery of Online VBR Media Streams", *INFOCOM '99. Eighteenth Annual Joint Conference of the IEEE Computer and Communications Societies. Proceedings. IEEE*, (Mar. 1999),447-454.

Freyhult, Stefan, "Streaming Video on IP Networks", *Master's Thesis in Computer Science at the School of Computer Science and Engineering, Royal Institute of Technology*, 2004, http://www.nada.kth.se/utbildning/grukth/exjobb/rapportlistor/2004/rapporter04/freyhult_stefan_04024.pdf,(Observed Oct. 10, 2005),35 pgs.

Hammad, Moustafa A., "A Stream Database for Sensor Applications", *Purdue University Department of Computer Sciences Technical Report CSDTR#02-009*, (May 2002),1-36.

Hilt, Volker, et al., "The Recording of Interactive Media Streams Using a Common Framework", *Praktische Informatik IV*; L15, 16; D-68131, (1998),1-15.

Hua, Kien A., et al., "Video Delivery Technologies for Large-Scale Deployment of Multimedia Applications", http://www.csee.umbc.edu/~pmundur/courses/CMSC691M-04/nimish-hua.pdf, (observed Oct. 1, 2005),13 pgs.

Kozamernik, Frank, et al., "Will Broadband TV Shape the Future of Broadcasting", *EBU Technical Review*, http://www.ebu.ch/en/technical/trev/trev_302-kozamernik.pdf,(Apr. 2005),1-21.

McCurdy, Neil J., et al., "A systems architecture for ubiquitous video", *Proceedings of the 3rd international conference on Mobile systems, applications, and services*, (2005),1-14.

Park, Soo-Jin, et al., "Fiber-to-the-Home Services Based on Wavelength-Division-Multiplexing", *Journal of Lightwave Technology*, 22(11), http://photonet.kaist.ac.kr/homepage/paper/paper1/file/47.pdf,(Nov. 2004),10 pgs.

Rainer, Leo, et al., "What's on the T.V.: Trends on U.S. Set-Top Box Energy Use, Design, and Regulation", *BNET White Paper*, http://library.iea.org/textbase/papers/2004/am_stb.pdf,(Sep. 2004),1-12.

Sen, Subhabrata, et al., "Proxy Prefix Caching for Multimedia Streams", http://pads1.cs.nthu.edu.tw/~liaoweik/download/proxy/Sen_ProxyPrefix_Infocom99.TR98-27.pdf, (Observed Oct. 11, 2005),26 pgs.

"International Application Serial No. PCT/US06/49091, International Search Report Oct. 25, 2007", 5 pgs.

"International Application Serial No. PCT/US06/49091, Written Opinion Oct. 25, 2007", 6 pgs.

"U.S. Appl. No. 11/316,066, response filed Nov. 14, 2008 to Non-Final Office Action mailed Aug. 14, 2008", 12 pgs.

"U.S. Appl. No. 11/316,066 Non-Final Office Action Mailed Aug. 14, 2008", OARN, 17 Pgs.

"International Application Serial No. PCT/2006/049091, International Preliminary Report on Patentability mailed Jul. 3, 2008", 6 pgs.

"International Application Serial No. PCT/US06/49091, International Search Report mailed Oct. 25, 2007", 5 pgs.

"International Application Serial No. PCT/US06/49091, Written Opinion mailed Oct. 25, 2007", 4 pgs.

"International Application Serial No. PCT/US06/49092, Intenational Preliminary Report on Patentability mailed Jul. 3, 2008", 8 pgs.

"International Application Serial No. PCT/US06/49092, International Search Report mailed Oct. 23, 2007", 5 pgs.

"International Application Serial No. PCT/US06/49092, Written Opinion mailed Oct. 23, 2007", 6 pgs.

* cited by examiner

| 600 PROGRAMMING IDENTIFICATION | |
|---|---|
| RECORD FOR TIME SHIFTING? | YES/NO |
| KEEP ON SYSTEM FOR HOW LONG? | INTEGER |
| NUMBER OF TIMES FOR REBROADCAST | INTEGER |
| PERMIT FAST FORWARD | YES/NO |
| LENGTH OF TIME SUBSCRIBER CAN SAVE | INTEGER |
| TYPE OF SUBSCRIBER WHO CAN SAVE OR VIEW | TYPE |

*FIG. 6*

SYSTEM AND METHOD FOR RECORDING AND TIME-SHIFTING PROGRAMMING IN A TELEVISION DISTRIBUTION SYSTEM WITH LIMITED CONTENT RETENTION

CROSS-RELATED APPLICATIONS

This application is related to U.S. application Ser. No. 11/316,066, entitled, "SYSTEM AND METHOD FOR RECORDING AND TIME-SHIFTING PROGRAMMING IN A TELEVISION DISTRIBUTION SYSTEM USING POLICIES," by Zesen Chen, Peter Chou, Sean Chen, Brian Gonsalves and Don Smith, filed on even date herewith, and assigned to SBC Knowledge Ventures, L.P.

TECHNICAL FIELD

The disclosed subject matter relates to the field of television distribution and programming, and more particularly to methods and systems including recording and/or time shifting television content.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2005, SBC Knowledge Ventures L.P. All Rights Reserved.

BACKGROUND

Subscribers to broadcast television sometimes desire to view television programming at times other than when the programming is broadcast. While digital video recorders (DVRs) such as the TIVO® system are used to record and time shift television programs, they are cumbersome to set up and use, particularly where the subscriber has to interconnect the DVR with a television, set top box or other television accessories. A particular challenge for subscribers to Internet protocol television (IPTV) is that not all channels are simultaneously received by the subscriber as they are in over-the-air or cable television broadcast systems. Therefore, the subscriber's ability to record live television broadcasts is limited to only those channels they can receive at one time.

BRIEF DESCRIPTION OF THE DRAWINGS

FIG. 6 illustrates a digital rights management policy for saving and distributing programming according to one example embodiment of the disclosed subject matter.

DETAILED DESCRIPTION

In the following detailed description, reference is made to the accompanying drawings that form a part hereof, and in which are shown by way of illustration specific embodiments in which the disclosed subject matter can be practiced. It is understood that other embodiments may be utilized and structural changes may be made without departing from the scope of the present disclosed subject matter. The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

As described further below, according to various example embodiments of the disclosed subject matter described herein, there is provided methods and systems to provide time shifting of television programming, including but not limited to methods and systems to manage the storage requirements on system servers used to record programming for later viewing by subscribers. As described in more detail below, in one example embodiment, the systems and methods provide for recording broadcast programming on one or more servers in the distribution system upstream from the subscribers, to enable time-shifted delivery of the recorded programming on demand from the subscribers.

Figure 1:
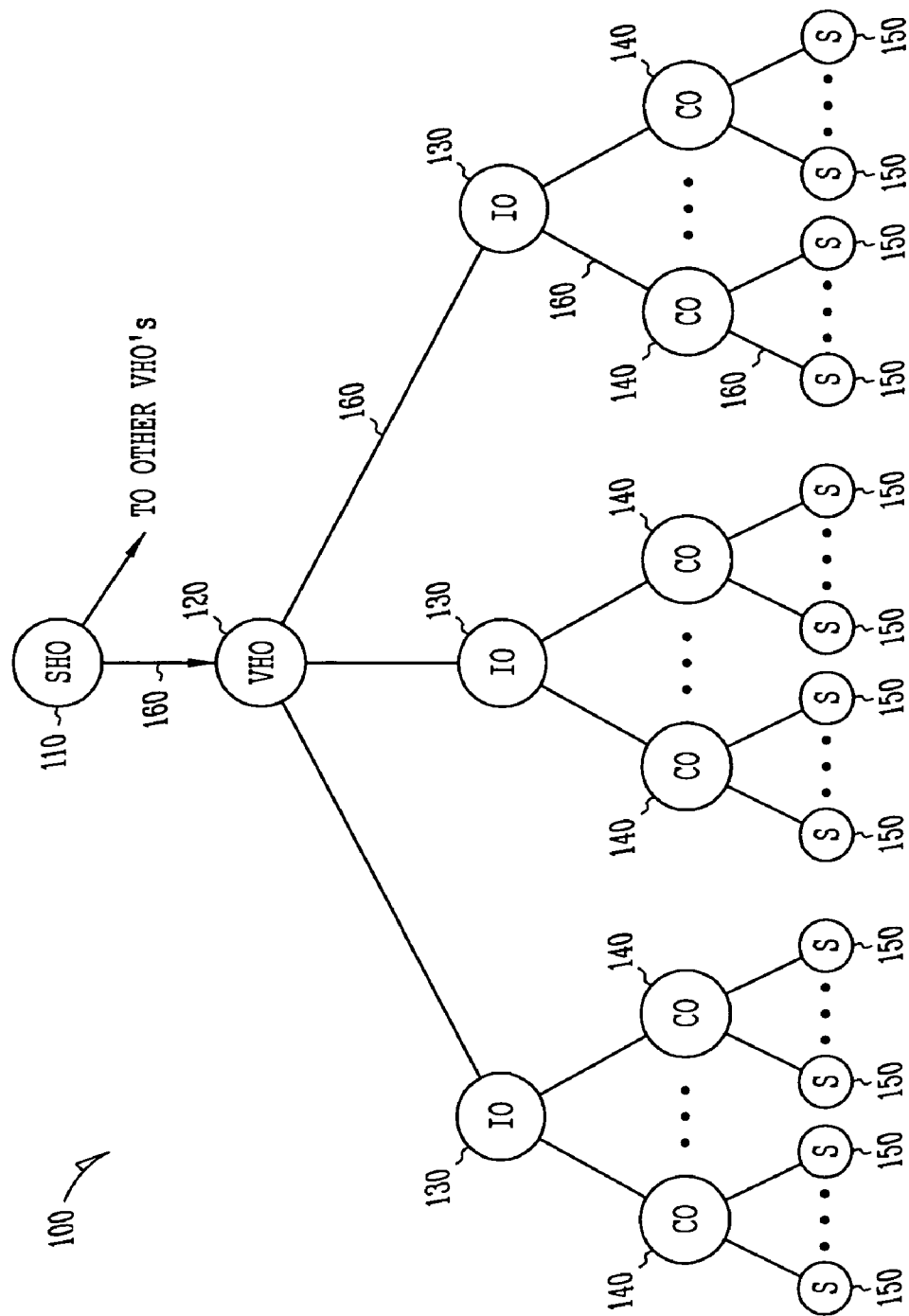
FIGS. 1, 2, 3 illustrate an IPTV network in accordance with one example embodiment of the disclosed subject matter hereof.
Figure 2:
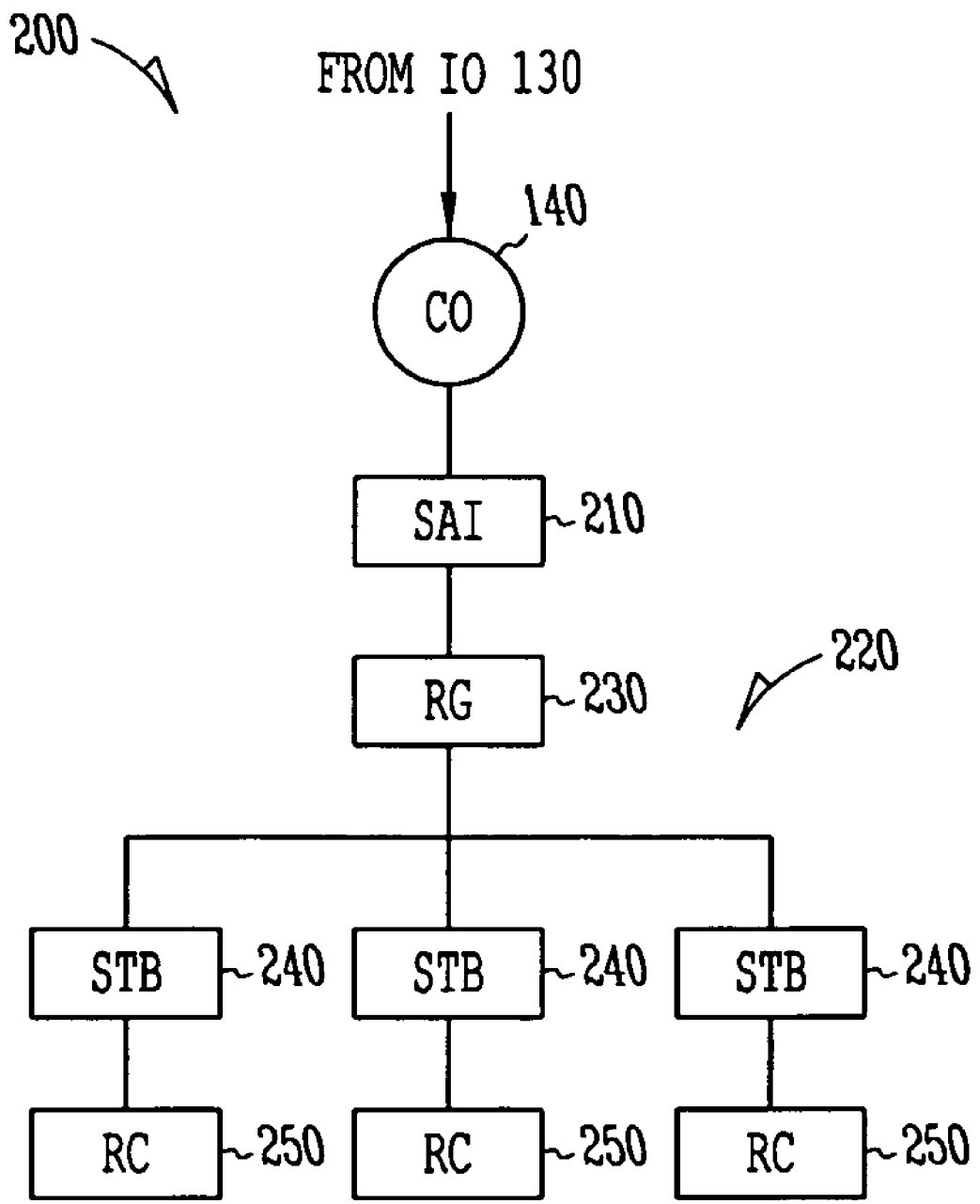
Figure 3:
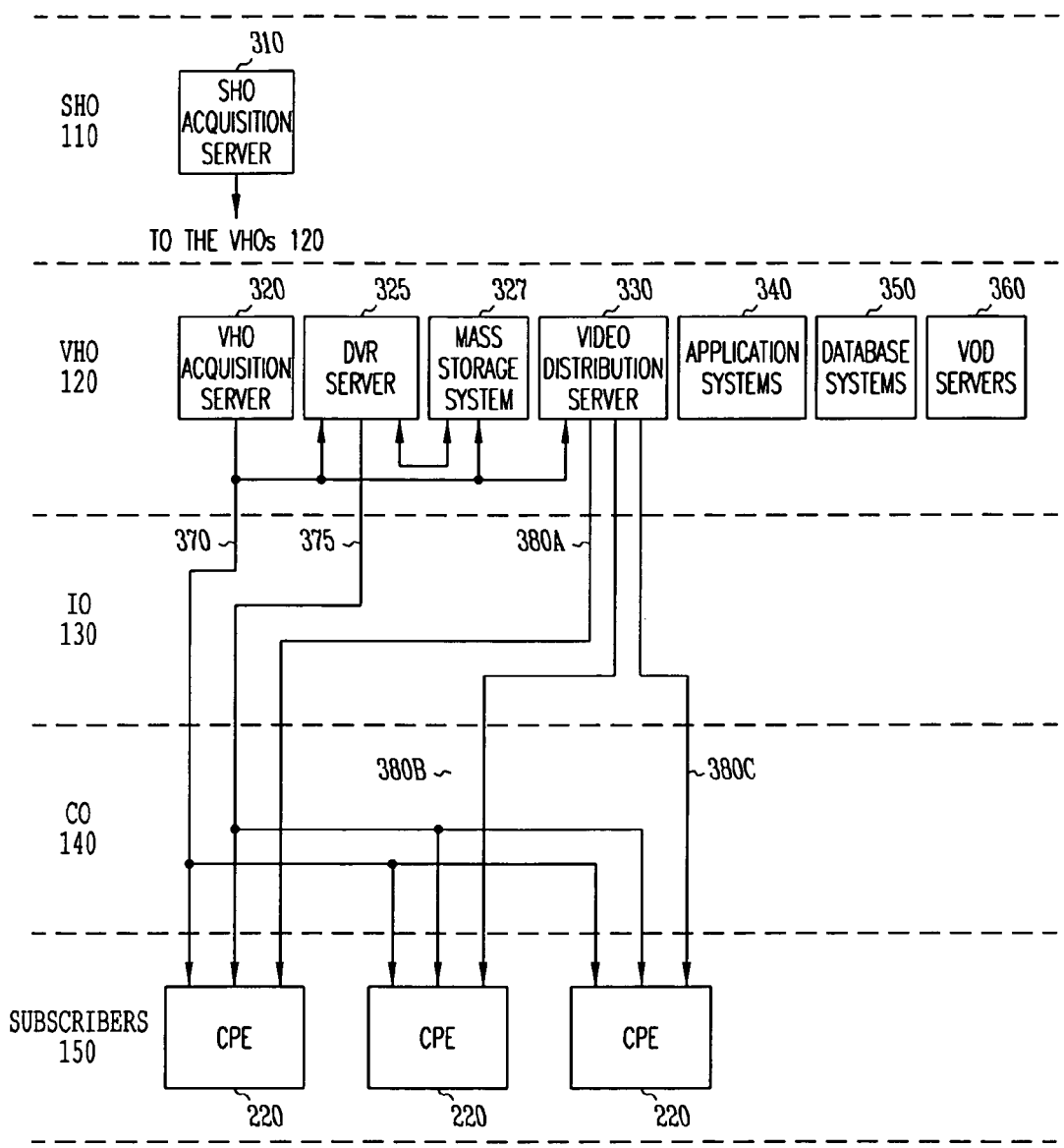

Referring now to FIGS. 1, 2 and 3, there is illustrated one example embodiment of a television distribution system 100, using IPTV technology in this example but not limited thereto, adapted to provide, among other things, the time shifting and storage management features of the disclosed subject matter. As shown in FIG. 1, the network 100 may include a super hub office (SHO) 110 for acquisition and encoding of video content, one or more video hub offices (VHO) 120 in each demographic market area (DMA), one or more intermediate offices (IO) 130, one or more central offices (CO) 140 located in each metropolitan area, and finally the subscribers (S) 150, which may be located in single or multiple dwelling units. In one example embodiment, the network 100 may be connected through a plurality of high speed communication links 160 using physical transport layers such as fiber, cable, twisted pair, air or other media.

In one example embodiment of the IPTV video delivery system, the SHO 110 distributes content to the VHOs 120 which may be spread across the a wide geographic territory, such as an entire country. The SHO 110 may, for example, be in a central location for acquisition and aggregation of national-level broadcast TV (or linear) programming. A redundant SHO 110 may be provided for backup in case of failure. The SHO 110 may also the central point of on-demand content acquisition and insertion into the IPTV network. Linear programming may be received at the SHO 110 via satellite and processed for delivery to the VHOs 120. On-demand content may be received from various sources and processed/encoded to codec and bit-rate requirements for the communication network for transmission to the VHOs 120 over the high speed communication links. VHOs 120 are the video distribution points within each demographic market area (DMA) or geographic region.

Referring now to FIG. 2, there is illustrated in more detail an example network architecture 200 between the CO 140 and the subscriber 150. A serving area interface (SAI) 210 may be connected to the CO 140. SAI 210 may, for example, be located in a weather-proof enclosure proximate the subscriber premises, and may include fiber-to-the-node (FTTN) equipment. FTTN equipment may also be located in the CO 140. Customer premise equipment includes (CPE) 220, for example, a network interface device (NID) and a residential gateway (RG) 230, for example with a built-in very-high-bit-rate digital subscriber loop (VDSL) modem or optical network termination (ONT). In both cases the RG 230 may be connected to the rest of the home set top boxes (STBs) 240 via an internal network such as an Ethernet. Each STB 240 has an associated remote control (RC) 250 which provides data entry to the STB 240 to control the IPTV selections from the IPTV data streams.

Referring now to FIG. 3, which illustrates one example embodiment of a configuration according to the disclosed subject matter, a SHO acquisition server 310 may be used to acquire national content that may be distributed towards the VHOs 120. In an alternative embodiment, live television content may be acquired using an acquisition server in the VHOs 120. In this configuration, the VHO 120 may include a live television acquisition server 320 and a video distribution server 330, which forward the live television and/or other content toward the subscriber through the intermediate offices (IOs) 130 and the central office (CO) 140. A VHO 120 may also include application systems 340, regional subscriber database systems 350, and VOD servers 360. The COs 140 are connected to the IOs 130 to further distribute traffic towards the subscribers 150. Traffic may reach the subscribers 150 at least partially via either fiber to the node (FTTN) or fiber to the premises (FTTP), or by other types of transmission medium.

As also illustrated in FIG. 3, acquisition server 320 may distribute a plurality of live television programs, each typically associated with a television "channel," using a multicast IP protocol data stream 370 through the IOs 130 and COs 140 to the subscribers 150. The routers, switches and other network elements that would normally be present in the IOs 130 and COs 140 are not shown in FIG. 3 in order to simplify the drawing. The number of programs or channels sent in the multicast stream may, without limitation, range up to 800 channels or more using present technology with it being understood that advances in technology may allow many more channels to be sent. The multicast protocol allows for efficient distribution of these signals to a large number of end subscribers. In addition, the video distribution server 330 receives the multicast data stream 370 and distributes selected ones of the live television signals, extracted from the stream 370, using a unicast data stream 380A, 380B and 380C, to specific subscribers 150. In this embodiment, video distribution server 330 may provide a unicast stream, for example in burst mode, of a specific live television channel to any of the subscribers served by the VHO 120. The burst mode instant channel change data stream can be discontinued once the subscriber's system is loaded with enough TV program data so that the multicast stream can "catch up" and take over supplying the program data stream in the multicast mode for more extended term viewing by the subscriber.

Also provided in the VHO 120, or alternatively at another distribution point in the IPTV network such as the SHO 110, IO 130 or CO 140, is an additional digital video recorder (DVR) DVR server 325 that acquires live television programming, records the programming/channels in digital form, and distributes the recorded content to subscribers using an unicast data stream in the same manner as server 330. In addition, DVR server 325 includes software to support interaction with subscribers 150 through STBs 240. For example, subscribers can, for example, interact with the DVR server 325 using a remote control 250 and a STB 240 to request programming be saved, view saved programming on their own list of saved content, and request delivery of the saved content to them from server 325. Alternatively, in another embodiment, the functions described for DVR server 325 may be performed by a single acquisition server such as server 320 or VOD server 360, and server 325 can be eliminated in whole or in part. The subscribers 150 may request content recorded on DVR server 325, which is delivered, in one example embodiment, with unicast data streams 380A, 380B or 380C. DVR server 325 may be connected to, in one example embodiment, one or more mass storage devices or systems 327, such as magnetic disk drives or optical recording systems.

According to one embodiment, access to regularly scheduled programming on the television channels, or alternatively access to recorded programming recorded under the control of DVR server 325, may be controlled by a STB 240 in the subscriber premises. Thus, in one example embodiment, each subscriber 150 receives live television programs from the VHO acquisition server 320 based on IP-based multicasting services, while the video distribution servers 330 are used to provide subscribers "instant" channel change and recover video packet losses to maintain acceptable quality of service. Further, the DVR server 325 provides recorded television programming upon demand by subscribers 150 as more fully described herein.

Figure 4:
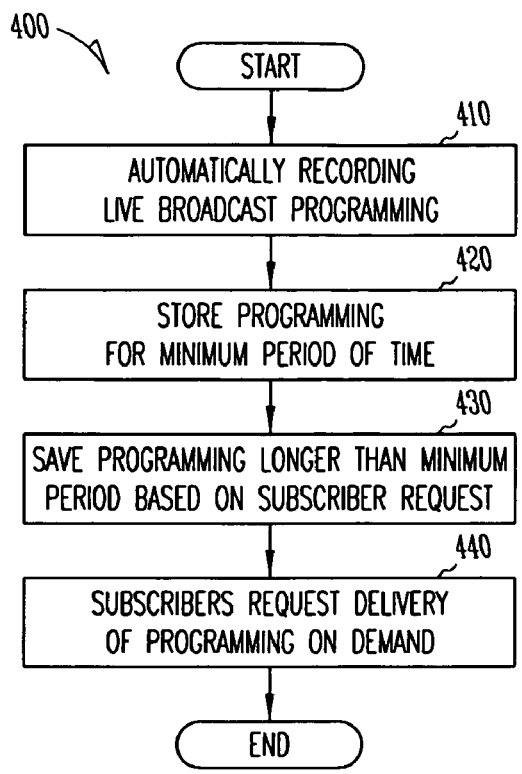
FIG. 4 illustrates a method for saving programming for time-shifted delivery according to one example embodiment of the disclosed subject matter.

Referring now to FIG. 4, there is illustrated an example embodiment 400 of a method according to the disclosed subject matter disclosed herein. Embodiment 400 provides for automatically recording live broadcast programming 410 for all or a group of television channels distributed by the system, wherein the recording is performed using one or more servers and storage devices, such as DVR servers 325 and storage system 327. All the automatically recorded programming is stored for at least some minimum period of time 420, for example seventy two (72) hours, or a period of time determined by an algorithm or formula, after it is broadcast at its regularly scheduled time. Unless designated or otherwise indicated for extended storage, the programming is thereafter automatically deleted or made available to be written over in order to free space on the storage system and limit the amount of storage required to support the time-shifting operation of the system. The system thus provides, for example in one embodiment, that all channels or at least, in one example embodiment, a designated group of channels, is stored at least during a sliding window of time following the regularly scheduled broadcast. Programming may be saved longer 430 than the minimum storage period based on requests for rebroadcast of the programming, or requests to keep the programming for rebroadcast upon demand at a later point in time. As used herein, the term "rebroadcast" is used to mean delivery of the programming to the subscriber seeking to view the programming after the programming has been previously broadcast in the system, and does not require that the programming be sent to more than one subscriber.

Subscribers may request 440 that the automatically recorded programming be rebroadcast to them on demand, for example by streaming the recorded programming from the DVR server 325 using a unicast IP data stream. Such requests for rebroadcast may be accomplished, for example, by identifying a program by name, or by specifying a time window for a particular channel. For example the stored content may be indexed by time and channel so that a subscriber can request rebroadcast of the stored live TV stream for a particular channel starting from a given time. The programs and content may also be indexed by program, such that a subscriber may request rebroadcast of a stored live TV program by choosing the program. The system may, in one example embodiment, cross-reference electronic programming guide information to determine the start and end time indices of a requested program. Once these are determined, the request would be handled identically to the case where the subscriber has requested a particular time frame for a channel to be rebroadcast.

For instance, a subscriber may request that a particular episode of a favorite television program be rebroadcast at a later point in time, or may request that a particular window of time from a particular television channel be rebroadcast. As explained further below, according to another example embodiment, even if recorded programming is saved beyond the minimum time period, there is a limit to the amount of time it will be stored even if it has not yet been rebroadcast by all of the subscribers who made a request. Further, although the request for delivery of programming is shown in FIG. 4 as occurring after a request to save programming, it is also possible that a request to deliver programming may occur without a request to save it, if such programming has already been stored on the server and the minimum time for saving it has not yet timed out or it is still available for delivery for some other reason.

According to one example embodiment, in order for programming to be saved longer than the minimum period, a request for rebroadcast must be received at least in advance of the expiration of the minimum period. For example, in one example embodiment, a request for rebroadcast must be received by at least one subscriber prior to seventy hours (72) after the initial broadcast, where the minimum storage period for the programming is three days. Alternatively, the request may be required at least prior to when the programming is no longer being stored, which may be longer than the minimum period based on requests for rebroadcasts received from other subscribers.

If programming is designated to be saved longer than the minimum storage period based on one or more requests to keep the programming for rebroadcast to the subscribers 150, the programming may be saved an additional period according to one or more different schemes or algorithms. For example according to one example algorithm, after expiration of the initial minimum recording period, recorded programming is kept by advanced request from subscribers, and in one example embodiment only by advance request. According to one example embodiment, for each channel/time-span permutation requested, the identities and number of subscribers requesting the recording are recorded. The programming is kept beyond the minimum time period for channels/time-spans which have outstanding requests from subscribers 150. As each subscriber views the requested content, the outstanding requests are decremented. When there are no longer any outstanding requests, i.e. when the decrement reaches zero, the stored programming may be deleted or the storage space for such content released to the system.

As noted above, even if recorded programming is saved beyond the minimum time period, there is a limit to the amount of time it will be stored even if it has not yet been rebroadcast by all of the subscribers who made a request to keep the programming for such rebroadcast before it is deleted or the storage space used for the programming made available to be recorded over. The maximum period of time that programming is saved may be a fixed period, for example no more than seven days after the initial minimum time period is over, or may be variable, based on a formula or algorithm. For example, if the initial time period was seventy two hours, any programming requested to be saved longer for rebroadcast could not be saved longer than an additional seven days, for a total of ten days, whether or not all the subscribers requesting the content to be saved had viewed it. According to another example embodiment, the amount of time the programming is stored in total may be limited channel by channel, such that if content on a particular channel is requested by many subscribers to be saved for rebroadcast it would be saved longer than content on a channel that had been requested by fewer subscribers. According to another example embodiment, if more than N subscribers have requested the same segment of a specific content, this content may be deleted after a delay period T, and in one example embodiment only after the delay period. T is decided by the following formula $T=C*\log(N)$, where C is a constant that may be empirically determined based on subscriber feedback and system parameters such as the amount of storage available.

According to one example embodiment, programming may be saved as specified in the following example:

Requests for saving programming:

Subscriber 1 requests channel A for 10:00 to 11:00.

Subscriber 2 requests channel A for 10:30 to 11:30.

Based on the above requests, the system may retain channel A beyond the minimum time period for storage as follows:

Segment 1—Channel A 10:00-10:30 Requests=1 (subscriber 1)

Segment 2—Channel A 10:30-11:00 Requests=2 (subscriber 1, subscriber 2)

Segment 3—Channel A 11:00-11:30 Requests=1 (subscriber 2)

Segments 1 and 2 are logically associated with subscriber 1's request.

Segments 2 and 3 are logically associated with subscriber 2's request.

As each subscriber's request is fulfilled, the associated segments' request and subscriber lists are decremented appropriately. A segment with no outstanding requests is deleted from storage after a delay, for example the delay T described above. The subscriber requests may also be timed out after a delay, e.g., a window of 14 days, or a variable delay T calculated as described above, to view requested content before the request is automatically timed out, for example by automatically decrementing the outstanding request count to zero.

Figure 5:
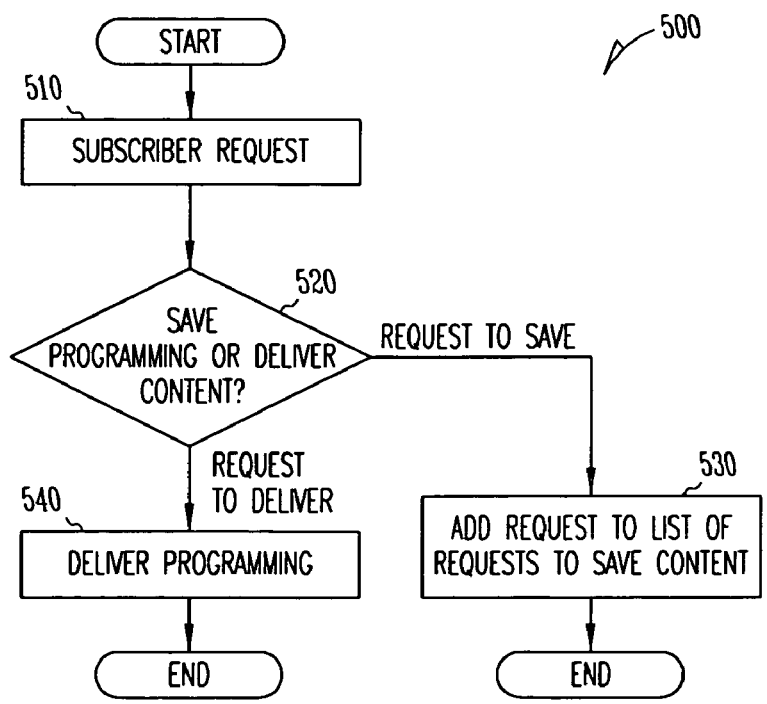
FIG. 5 illustrates a method for a subscriber to make requests for saving and receiving saved programming according to one example embodiment of the disclosed subject matter.

Referring now to FIG. 5, there is illustrated an example embodiment 500 of subscriber use of the system described herein. According to one example embodiment, the subscriber uses the STB 240 to make requests 510 to save programming for later rebroadcast on demand, or to rebroadcast content on demand momentarily. If the request is to save content for later rebroadcast 520, then the system adds the request to the list of requests to save content maintained by the system, for example on the server 325. If the request is for immediate rebroadcast of recorded programming, then the system, for example server 325, initiates rebroadcast of the programming to the subscriber, for instance using a unicast IP data stream to the subscriber's STB 240. According to one embodiment, the subscriber may make a request for a rebroadcast if they made a previous request for saving the content, and in one embodiment only if they made a previous request, but in another embodiment, the subscriber may at any time request on demand rebroadcast of programming that is still saved in the system, even if no prior request for saving the content was made. Further, the system may provide, through the use of a STB 240, to display to subscriber content available for rebroadcast. Further, this service may be optional and may require the subscriber to pay an additional fee for the service. According to still another example embodiment, any rebroadcast programming is presented to the user, under control of the STB 240 for example, with all original advertising present, so that the subscriber is not allowed an opportunity to fast forward through the rebroadcast content to avoid the commercial content. Alternatively, the subscriber may be allowed to fast forward through the rebroadcast or otherwise pause or stop the rebroadcast, using the RC 250.

According to still another example embodiment, the methods and systems provide that once a subscriber has had a program rebroadcast to them one time, that program or time segment is deleted from the subscribers list of content saved for rebroadcast such that the subscriber cannot again request rebroadcast of the same content. Accordingly, the system does not permit multiple rebroadcasts of the same content.

According to still another example embodiment, the system and method may permit a digital rights management policy to be established for one or more of the following: a television channel or group of channels, a television program, a time segment in a programming schedule, such as midnight to six in the morning, or a type of program, such as reruns or first broadcasts or content—e.g. sports or news, late night television, reruns, old movies or new movies. The foregoing are examples only, and digital rights management policies may be established in other ways for managing programming. Furthermore, the system and method may provide that television programming be recorded and rebroadcast or delivered in accordance with one or more policies established for the content, and in one embodiment only in accordance with the one or more policies, by any or more than one of the categories mentioned, or other categories or characterizations of programming. For example, a network may require that football programs not be recorded for rebroadcast, or that any rebroadcast occurs more than one day after the initial programming was broadcast. In one embodiment, these policies may be stored on the DVR server 325 or on any other computer or storage device in the system. Using such digital rights management, therefore, the operator of the television distribution system can tailor the system to the requirements or demands of the content owners.

Referring to FIG. 6, there is illustrated a digital rights management policy 600 for saving and distributing programming according to one example embodiment of the disclosed subject matter. Policy 600, in this example, includes an identification 610 of the programming or time slot and channel for a particular program, or identifies programming by other means such as noted above, for example by type of content or by channel or otherwise. Policy 600 includes a plurality of permissions or policies, for example specifying whether the programming may be recorded for time shifting 620, how long it can be kept after recording 630, how many times it may be rebroadcast to a particular subscriber 640, whether or not the system should allow fast forwarding through the content 650, how long a subscriber may save it after recording 660, the type of subscriber that it may be saved for 670, or any other desired policy.

Thus, as described above, the systems and methods described herein provide for time shifting of television broadcasts, including but not limited to methods and systems to manage the storage requirements for such operation. As described above in various embodiments, the system and method provides for recording broadcast programming on one or more servers in the distribution system upstream from the subscribers, and rebroadcast of the programming on demand to time-shift it from the originally scheduled time to a time desired by the subscriber. Subscribers are therefore provided greater flexibility in viewing programming without the additional cost and logistics required if they use a personal DVR located on their premises. While the example embodiments herein are generally illustrated in the environment of an IPTV system, in an alternative embodiment a cable distribution system or satellite distribution system is used instead that does not use IPTV methodologies but instead any other available distribution techniques, such as classic frequency modulation or each channel in a television frequency band, or time division or orthogonal frequency division multiplexing, for example only and not by way of limitation. Further, the IPTV may be delivered over-the-air using, for example, broadband wireless telecommunications techniques.

Figure 7:
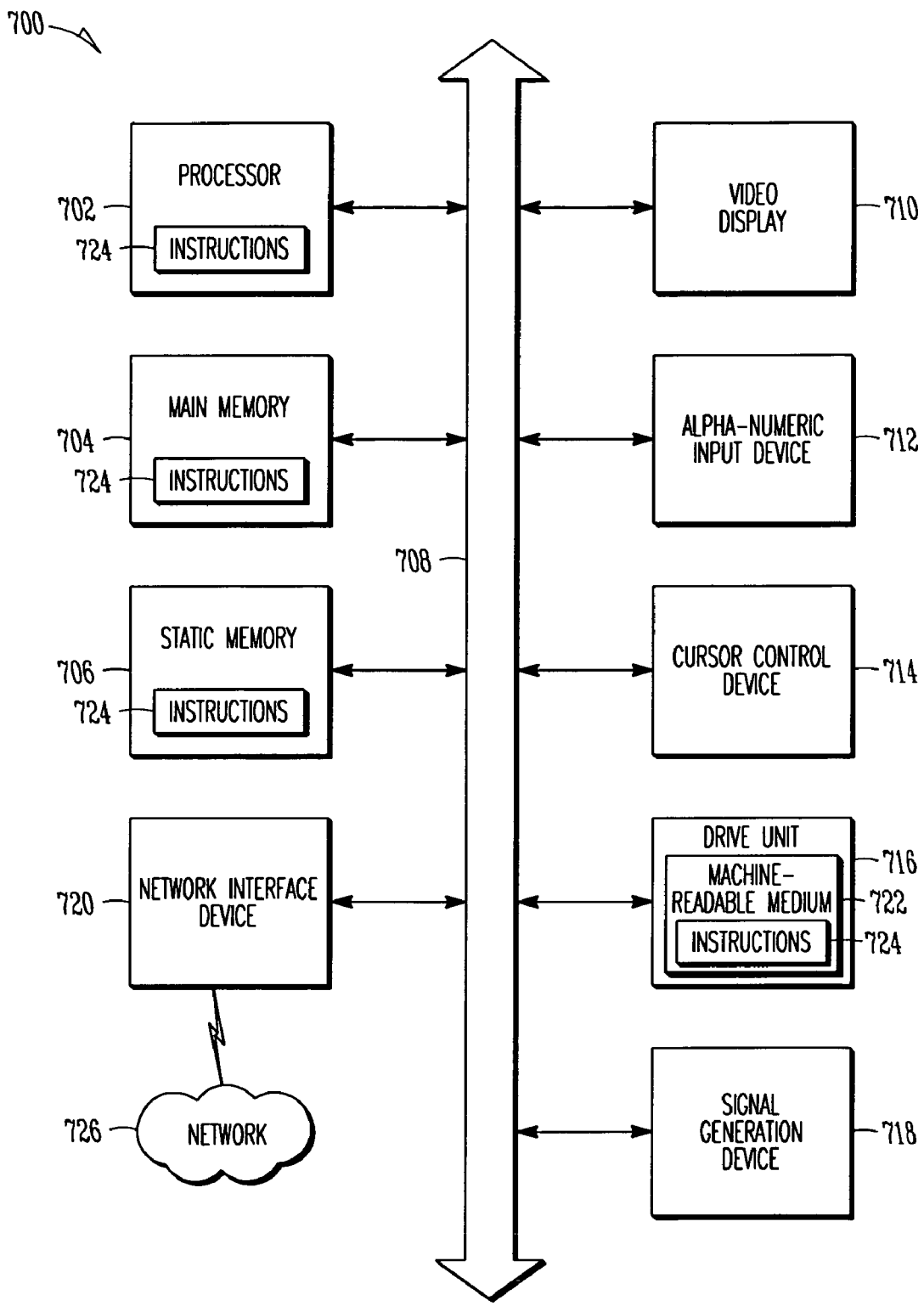
FIG. 7 illustrates an example embodiment of a computing system according to the disclosed subject matter.

Referring now to FIG. 7 shows a diagrammatic representation of machine in the example form of a computer system 700 of a type sufficient for use in any of the example embodiments set forth herein. System 700 may include a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions and data structures (e.g., software 724) embodying or utilized by any one or more of the methodologies or functions described herein. The software 724 may also reside, completely or at least partially, within the main memory 704 and/or within the processor 702 during execution thereof by the computer system 700, the main memory 704 and the processor 702 also constituting machine-readable media.

The software 724 may further be transmitted or received over a network 726 via the network interface device 720 utilizing any one of a number of well-known transfer protocols, for example the hyper text transfer protocol (HTTP). While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosed subject matter, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although the present specification describes components and functions implemented in the embodiments with reference to particular standards and protocols, the disclosed subject matter may be not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

Although the disclosed subject matter has been described with reference to several example embodiments, it may be understood that the words that have been used are words of description and illustration, rather than words of limitation. Changes may be made within the purview of the appended claims, as presently stated and as amended, without departing from the scope and spirit of the disclosed subject matter in all its aspects. Although the disclosed subject matter has been described with reference to particular means, materials and embodiments, the disclosed subject matter is not intended to be limited to the particulars disclosed; rather, the subject matter extends to all functionally equivalent structures, methods, and uses such as are within the scope of the appended claims.

What is claimed is:

1. A method comprising:
    recording broadcast programming for at least one television channel for a period of time, wherein the recording is performed upstream from subscribers in a television distribution system;
    after the period of time, keeping recorded programming for rebroadcast by request from at least one subscriber, wherein the request occurs prior to a second point in time based in part on requests made by other subscribers;
    wherein the request is for at least one television program contained in the recorded programming or for a time window for a particular channel; and
    further comprising deleting recorded content after a third period of time, wherein if more than N subscribers have requested the same content of the broadcast, deleting the content after a delay period T, wherein T=C*log(N), and further wherein C is a constant that may be changed to adjust the operation of the system based on subscriber feedback and system parameters including an amount of storage available.

2. A method according to claim 1, wherein the request occurs prior to the regularly scheduled broadcast of the programming.

3. A method according to claim 1, wherein the request occurs after the regularly scheduled broadcast of the programming.

4. A method according to claim 1, further wherein the broadcast programming is saved on one or more mass storage devices.

5. A method according to claim 1, further including displaying a list of content that may be saved upon request.

6. A method according to claim 1, further including a subscriber requesting saved content be delivered for display on a television viewing device.

7. A non-transitory computer readable storage medium comprising computer instructions for causing a machine to:
    record broadcast programming for at least one television channel for a period of time, wherein the recording is performed upstream from subscribers in a television distribution system;
    after the period of time, keep recorded programming for rebroadcast by request from at least one subscriber, wherein the request occurs prior to a second point in time based in part on requests made by other subscribers;
    wherein the request is for at least one television program contained in the recorded programming or for a time window for a particular channel; and
    further comprising deleting recorded content after a third period of time, wherein if more than N subscribers have requested the same content of the broadcast, deleting the content after a delay period T, wherein T=C*log(N), and further wherein C is a constant that may be changed to adjust the operation of the system based on subscriber feedback and system parameters including an amount of storage available.

8. The storage medium of claim 7, wherein the request occurs prior to the regularly scheduled broadcast of the programming.

9. The storage medium of claim 7, wherein the request occurs after to the regularly scheduled broadcast of the programming.

10. The storage medium of claim 7, wherein the broadcast programming is saved on one or more mass storage devices.

11. The storage medium of claim 7, wherein a list of content is displayed that may be saved upon request.

12. The storage medium of claim 7, comprising computer instructions to cause the computer to deliver saved content for display on a television viewing device in response to a subscriber's request.

13. A method comprising:
    recording broadcast programming for at least one television channel for a period of time, wherein the recording is performed upstream from subscribers in a television distribution system;
    after the period of time, keeping recorded programming for rebroadcast by request from at least one subscriber, wherein the request occurs prior to a second point in time based in part on requests made by other subscribers, and wherein the request is for at least one television program contained in the recorded programming or for a time window for a particular channel, wherein the broadcast programming is saved on one or more mass storage devices;
    deleting recorded content after a third period of time, wherein if more than N subscribers have requested the same content of the broadcast, deleting the content after a delay period T, wherein T=C*log(N), wherein C is a constant that may be changed to adjust the operation of the system based on subscriber feedback and system parameters including an amount of storage available; and
    delivering saved content for display on a television viewing device in response to a subscriber's request.

14. The method of claim 13, wherein the request occurs prior to the regularly scheduled broadcast of the programming.

15. The method of claim 13, wherein the request occurs after to the regularly scheduled broadcast of the programming.

16. The method of claim 13, comprising providing information for displaying a list of content that may be saved upon request.

* * * * *